(12) United States Patent
Chen et al.

(10) Patent No.: US 6,469,463 B2
(45) Date of Patent: Oct. 22, 2002

(54) BRUSHLESS MOTOR AND DRIVING CONTROL DEVICE THEREFOR

(75) Inventors: Hui Chen; Shuji Endo, both of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/814,181

(22) Filed: Mar. 22, 2001

(65) Prior Publication Data

US 2002/0011811 A1 Jan. 31, 2002

(30) Foreign Application Priority Data

Mar. 22, 2000 (JP) ........................................ 2000-079983

(51) Int. Cl.$^7$ ................................................ H02P 6/12
(52) U.S. Cl. ........................ 318/439; 318/254; 318/721
(58) Field of Search ................................ 318/138, 254, 318/439, 700, 721, 722, 801, 724

(56) References Cited

U.S. PATENT DOCUMENTS

| | | | |
|---|---|---|---|
| 5,361,021 A | 11/1994 | Meyer et al. ................ | 318/254 |
| 5,717,584 A | * 2/1998 | Rajashekara et al. ......... | 363/98 |
| 5,821,714 A | 10/1998 | Williams .................... | 318/439 |
| 5,869,946 A | 2/1999 | Carobolante ................ | 318/811 |
| 5,938,052 A | * 8/1999 | Miyano et al. ............. | 212/275 |
| 5,955,851 A | 9/1999 | Solie et al. ................. | 318/254 |

FOREIGN PATENT DOCUMENTS

| | | | |
|---|---|---|---|
| EP | 0 966 093 A2 | 12/1999 | ............. H02P/6/00 |
| JP | 11-356083 | 12/1999 | ............. H02P/6/10 |

OTHER PUBLICATIONS

Sedra/Smith: "Microelectronic Circuits", Fourth Edition, Oxford University Press, Oxford, 1998, pp. 1172–1175.*
Stephen Chapman:"Electric Machinery Fundamentals", Third Edition, McGraw–Hill, 1999, p. 228.*

* cited by examiner

Primary Examiner—Bentsu Ro
(74) Attorney, Agent, or Firm—Sughrue Mion, PLLC

(57) ABSTRACT

There is provided a brushless motor and a driving control device therefor both of which can restrain the occurrence of current variations, torque variations and noise in the brushless motor, thereby constructing an electrically-operated power steering system of low noise and good steering feeling. In the driving control device for the brushless motor having a current variation rate control part which controls a current variation rate during commutation, and having plural excitation phases, the current variation rate control part terminates commutation transient time which is the time for which phase currents are in a transient state during a commutation operation, within ½ of commutation interval time which is the time required from the starting time of a certain commutation until the starting time of the next commutation.

8 Claims, 13 Drawing Sheets

BRUSHLESS MOTOR AND DRIVING CONTROL DEVICE THEREFOR

BACKGROUND OF THE INVENTION

1. Field of the Invention

The present invention relates to a brushless motor having plural excitation phases as well as a driving control device for the brushless motor and, more particularly, to a brushless motor suited to a drive source for an electrically-operated power steering system as well as a driving control device for such a brushless motor.

2. Description of the Related Art

Brushless motors used as drive sources for the power steering systems of automobiles are motors having three or more excitation phases, and are driven by means of excitation currents of rectangular waveforms.

For example, in the case of a 5-phase brushless motor, a motor driving circuit rotationally drives its rotor by exciting 5-phase excitation coils "a" to "e" hereinafter referred to also as "a-phase" to "e-phase") by a rectangular wave current while switching the coils "a" to "e" sequentially from phase to phase by a 4-phase excitation method of simultaneously exciting four phases, under control of a control circuit such as a microcomputer, the 5-phase excitation coils "a" to "e" being disposed to surround the outer circumferential surface of the rotary element(rotor) of the motor in the state of being spaced apart by an electrical angle of 72 degrees. In the 4-phase excitation method, motor currents flow in four phases from among five phases, and the coil resistances of the respective excitation coils are formed to be all equal so that currents can flow in the respective phases with good balance.

Such a motor driving circuit is normally made of ten field effect transistors(FETs). Among these ten transistors, each pair of two corresponding transistors are connected in series to form five series transistor circuits, and each of the series transistor circuits is connected between the positive and negative terminals of a power source, and the connection between the two transistors of each of the series transistor circuits is connected to each of the five excitation coils "a" to "e" interconnected by a Y-shaped star connection, thereby being connected to the coil circuit of the motor.

The direction and length of an excitation current (rectangular wave) which is supplied to each of the excitation coils from the motor driving circuit are as shown in FIG. 1 by way of example with respect to the rotational angle (electrical angle) of the rotor. Specifically, the excitation coils are switched sequentially from phase to phase by an electrical angle of 36 degrees, thereby exciting one phase coil through an electrical angle of 144 degrees to continuously rotate the rotor. In FIG. 1, letting θ be the electrical angle, (1) to (10) denote respectively the following intervals: 0°≦θ<36°, 36°≦θ<72°, 72°≦θ<108°, 108°≦θ<144°, 144°≦θ<180°, 180°≦θ<216°, 216°≦θ<252°, 252°≦θ<288°, 288°≦θ<324°and 324°≦θ<360°.

In this example, the a-phase current flows in the plus direction through the intervals (1) and (2), then returns to "0" in the interval (3), then flows in the minus direction through the intervals (4) to (7), then returns to "0" in the interval (8), and again flows in the plus direction through the intervals (9) and (10) and back in the interval (1). The b-phase current flows in the plus direction through the intervals (1) and (4), then returns to "0" in the interval (5), then flows in the minus direction through the intervals (6) to (9), then returns to "0", in the interval (10), and again flows in the plus direction in the interval (1). The c-phase current flows in the minus direction in the interval (1), then returns to "0" in the interval (2), then flows in the plus direction through the intervals (3) to (6), then returns to "0" in the interval (7), and again flows in the plus direction through the intervals (8) to (10) and back in the interval (1). The d-phase current flows in the minus direction through the intervals (1) to (3), then returns to "0" in the interval (4), then flows in the plus direction through the intervals (5) to (8), then returns to "0" in the interval (9), and again flows in the plus direction in the interval (10). The e-phase current remains "0" in the interval (1), then flows in the minus direction through the intervals (2) to (5), then returns to "0" in the interval (6), then flows in the plus direction through the intervals (7) to (10), and again returns to "0" in the interval (1). Accordingly, at the boundary between each of the intervals (1) and (10)(at the time of switching performed every 36 degrees in electrical angle), two of the five excitation coils are switched in the mutually opposite directions.

This switching of such an excitation current is in principle represented by the rise or the fall of a rectangular wave as shown in FIG. 1. However, actually, the waveform of the rise or the fall does not change perpendicularly to the horizontal axis and a certain period of time Δt(about three times the time constant of the motor circuit) is taken until the excitation current rises in the plus direction or falls in the minus direction.

For example, at the boundary between the intervals (8) and (9) of FIG. 1(288 degrees in electrical angle), the a-phase current rises from "0" to a plus constant value, while the d-phase current falls from the plus constant value to "0", and the b-phase current and the c-phase current remain at the minus constant value with the e-phase current remaining at the plus constant value. FIG. 2 shows on an enlarged scale the variations in the waveforms at this boundary.

Specifically, the a-phase rise current gradually increases from "0" to the plus constant value during the time Δt, while the d-phase fall current decreases from the plus constant value to "0" during time Δt1 shorter than the time Δt (smaller than the time constant of the motor circuit). During this time, the other three phases "b", "c" and "e" remain unswitched. Letting $i_a$, $i_b$, $i_c$, $i_d$ and $i_e$ represent respectively the five phase currents, the relationship of the following expression (1) is established among these currents:

$$i_a+i_d+i_e=-(i_b+i_c)=I \qquad (1)$$

Accordingly, as the a- and d-phase currents vary as described above, the b-, c- and e-phase currents also vary. In other words, since the a-phase current and the d-phase current differ in current variation rate, the total value of these two phase currents does not become a steady value and the b- and c-phase currents vary as shown in FIG. 2, so that the e-phase current also varies during the time Δt. These current variations cause transient torque variations.

The reason why the current variation rates of two phase currents differ between their rises as well as their falls as described above is as follows.

Let "Vb" denote a power source voltage to be supplied to the motor driving circuit, and "Vn" denote a voltage provided at the central connection point of the star-connected excitation coils "a" to "e". In addition, let (1) and (2) in FIG. 2 denote the interval of the time Δt1 and the interval of time Δt2 (=Δt−Δt1), respectively.

In the interval (1), the d-phase(OFF-phase) current $i_d$, which is switched from plus to "0", lowers to zero(0) from half(I/2) of an energization current I supplied to the motor from the motor driving circuit, at a variation rate according to a voltage −Vn, a counter-electromotive voltage $E_d$ of the coil and the time constant of the motor circuit. At this time, letting $V_{OFF}$ denote a voltage to be applied to the OFF-phase equivalent circuit, $V_{OFF}$=−Vn−Ed<0, and Vn approximates Vb/2. On the other hand, the a-phase(ON-phase) current $i_a$, which is switched from "0" to plus, rises from zero(0) at a variation rate according to the voltages Vb and −Vn, a counter-electromotive voltage $E_a$ of the coil and the time constant of the motor circuit. At this time, letting "$V_{ON}$" denote a voltage to be applied to the ON-phase equivalent circuit, "$V_{ON}$=Vb×Duty1(PWM duty)−Vn−Ea".

If the current $i_d$ is explained using an expression, the current $i_d$ is expressed from the OFF-phase equivalent circuit by the following expression (2):

$$i_d(t)=(I/2)e^{-t/T}+(V_{OFF}/R)(1-e^{-t/T}) \quad (2)$$

∴when t=0, $i_d$=I/2, where "T" denotes the electrical time constant of the equivalent circuit and "R" denotes the resistance of the equivalent circuit.

In addition, the current $i_a$ is expressed from the ON-phase equivalent circuit by the following expression (3):

$$i_a(t)=(V_{ON}/R)(1-e^{-t/T}) \quad (3)$$

∴when t=0, $i_a$=0, and for t→∞, $i_a=V_{ON}/R=I/2$.

Accordingly, the variation rates of the respective OFF-phase and ON-phase currents $i_d$ and $i_a$ become as follows:

$$di_d(t)/dt = -(1/T)(I/2)e^{-t/T} + (1/T)(V_{OFF}/R)e^{-t/T} \quad (4)$$
$$= -(I/2 - V_{OFF}/R)(1/T)e^{-t/T}$$
$$= -(I/2 + Vn/R + Ed/R)(1/T)e^{-t/T}$$

$$di_a(t)/dt = (1/T)(V_{ON}/R)e^{-t/T} \quad (5)$$
$$= (I/2)(1/T)e^{-t/T}$$

In the expressions (4) and (5), since (I/2+Vn/R+Ed/R)>I/2, the current variation rate of the OFF-phase is greater than the current variation rate of the ON-phase. Particularly in the case where the resistance R of the equivalent circuit is small, or the power source voltage Vb(≈2Vn) is large, or the counter-electromotive voltage Ed is large owing to high-speed rotations, the current variation rate of the OFF-phase is considerably greater than the current variation rate of the ON-phase. Therefore, the time(Δt1) required for the OFF-phase current $i_d$ to lower from I/2 to "0" is longer than the time (Δt) required for the ON-phase current $i_a$ to rise from "0" to I/2; that is, the ON-phase current $i_a$ does not reach I/2 at the end of the interval (1) and is still rising. After that, in the interval (2), the ON-phase current $i_a$ finally reaches the steady value (I/2), but the time Δt2(twice to three times the time constant of the motor circuit) is required until that instant. Accordingly, the current variation rates of two switched phase currents differ between their rises as well as their falls.

In the control of excitation currents by the above-described prior art motor driving circuit, since the variation rates of switched currents(for example, the a-phase and the d-phase shown in FIG. 1) differ, the currents of unswitched phases(for example, the b-, c- and e-phases shown in FIG. 1) vary and transient torque variations due to these current variations occur.

To restrain the current variations due to phase switching which cause such torque variations, it is preferable to control each of the phase currents. However, in such control, each of the phase currents needs to be detected, and two or more current detecting circuits are needed. Particularly in the case of a 5-phase brushless motor, because a 4-phase excitation method is adopted, its motor driving circuit needs four current detecting circuits and four current loops, so that there is the problem that the construction of the driving circuit becomes complicated and costs become high.

To solve the problem, it has been proposed to provide, for example, an apparatus for controlling the driving of a brushless motor having plural excitation phases which apparatus includes a driving part which generates an excitation signal to be supplied to each excitation phase of the brushless motor, and a control part which performs ON/OFF switching of, and determines the direction of, the excitation signal for each excitation phase, the control part controlling the variation rates of excitation signals of phases to be switched during the switching. According to this construction, the control part performs ON/OFF switching of, and determines the direction of, the excitation signal to be supplied from the driving part for each excitation phase of the brushless motor. By controlling the variation rates of the excitation signals to be switched during the switching, it is possible to make the current variation rates of the two switched phases coincident with(or similar to) each other. Thus, the current variations of the unswitched phases are restrained, and the above-described torque variations are eliminated.

In addition, since the excitation signals can be generated merely be detecting currents flowing in a motor circuit, it is not necessary to detect each phase current for the purpose of controlling the variation rates of the excitation signals, and a circuit construction for control does not become complicated.

As another apparatus for controlling a current variation rate during commutation, it has been proposed to provide a motor driving control apparatus for driving and controlling a brushless motor having plural excitation phases without using two or more current detecting circuits which detect excitation currents of the brushless motor, which apparatus includes a driving part which generates an excitation signal to be supplied to each excitation phase of the brushless motor, and a control part which performs ON/OFF switching of, and determines the direction of, the excitation signal for each excitation phase, the control part generating the excitation signal so that the total value of excitation currents of the respective excitation phases of the motor during the switching is kept constant. This apparatus is of the type that drives the brushless motor by means of rectangular waves by using a single current detecting circuit, and controls the current variation rates of rise phases and fall phases during phase current switching, thereby keeping constant the motor current during phase switching so that current variations and electromagnetic torque variations can be restrained. Accordingly, the above-described apparatus can realize a high-performance servo motor which is inexpensive and has low current variation and low torque variation.

However, in the above-described method of driving the brushless motor by means of rectangular waves and controlling the variation rates of fall currents during commutation, as the rotational speed of the motor becomes faster, the proportion of commutation transient time in commutation interval time becomes higher. Incidentally, the term "commutation interval time" means the time required from the starting time of a certain commutation until the starting time of the next commutation, and the term "commutation transient time" means the time for which phase currents are in a transient state during commutation operation.

As shown in FIG. 3, if the transient process time during which the rise-phase phase current id gradually lowers exceeds ½ of the commutation interval time(the time for which the motor rotates at a constant speed), there occurs the phenomenon that the polarity of the rise-phase counter-electromotive voltage Ed changes and the fall-phase phase current id contrarily rises. In FIG. 3, "t1" denotes the starting time of a commutation 1, "θ1" denotes the electrical angle of a rotor position at the time t1, "t2" denotes the starting time of the next commutation 2, "θ2" denotes the electrical angle of the rotor position at the time t2, "t3" denotes the time at which the polarity of an OFF-phase counter-electromotive voltage changes, and "θ3" denotes the electrical angle of the rotor position at the time t3. In this manner, the rise-phase current rises, whereby current variations, torque variations and noise occur in the motor.

In addition, if the fall-phase current continues to flow for ½ or more of the commutation interval time, the polarity of the counter-electromotive voltage of that phase changes, so that in the phase a rotational torque occurs in the opposite direction to the original rotational torque of the motor and the total torque of the motor lowers. The lowering of the motor torque depends on the rotational speed of the motor, and if the motor is to be used as a torque assist device for an electrically-operated power steering system of a vehicle, there is the problem that an operator suffers a viscous steering feeling.

SUMMARY OF THE INVENTION

The present invention has been made in view of the above-described problems, and provides a brushless motor and a driving control device therefor both of which can restrain the occurrence of current variations, torque variations and noise in the brushless motor and which can be applied to a torque assist device for an electrically-operated power steering system, thereby constructing an electrically-operated power steering system of low noise and good steering feeling.

The present invention relates to a brushless motor having a current variation rate control part which controls a current variation rate during commutation, and having plural excitation phases, as well as to a driving control device for such brushless motor, and the present invention is achieved in such a way that the current variation rate control part terminates commutation transient time which is the time for which phase currents are in a transient state during a commutation operation, within ½ of commutation interval time which is the time required from the starting time of a certain commutation until the starting time of the next commutation.

The present invention is more effectively achieved in such a way that the electrical time constant of the brushless motor that contains the impedance of a driving circuit is made ⅙ or less of the commutation interval time, or in such a way that the current variation rate control part controls the commutation transient time by commutation-phase current control using the rotational speed of the brushless motor as a variable, or in such a way that the current variation rate control part controls the commutation transient time by commutation-phase current control using the rotational electrical angle of the brushless motor as a variable.

Moreover, the present invention is more effectively achieved in such a way that the current variation rate control part limits the interval during which to supply a driving current for a fall phase of the commutation phase of the excitation coil.

BRIEF DESCRIPTION OF THE DRAWINGS

The present invention will become more readily appreciated and understood from the following detailed description of a preferred embodiment of the invention when taken in conjunction with the accompanying drawings, in which.

DETAILED DESCRIPTION OF THE INVENTION

Figure 4:
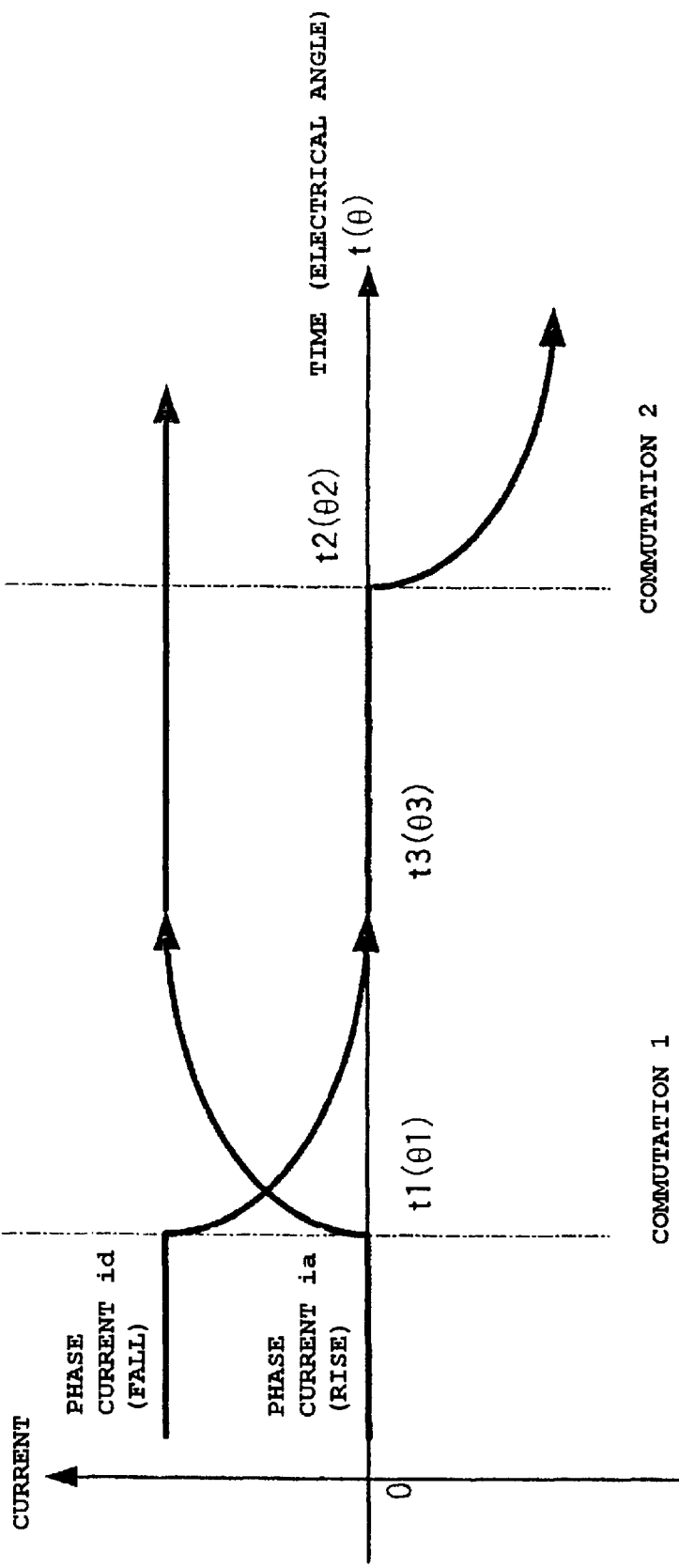
FIG. 4 is a waveform diagram showing an example of an OFF-phase current variation in a brushless motor and a driving control device thereof according to an embodiment of the present invention.

The brushless motor and the driving control device therefor according to the present invention are constructed to terminate commutation transient time within ½ of commutation interval time, as shown in FIG. 4. Accordingly, even while the brushless motor is rotating at high speed, commutation current(currents "ia" and "id") can be stabilized before the next commutation starts, whereby variations in current and torque in the brushless motor can be restrained to suppress noise.

The brushless motor and the driving control device therefor according to the present invention are constructed so that the electrical time constant of the brushless motor that contains the impedance of a driving circuit can be made ⅙ or less of commutation interval time, thereby terminating commutation transient time within ½ of the commutation interval time, whereby even during high-speed rotation, the variation rates of a rise-phase current and a fall-phase current can be made coincident with each other. Accordingly, as shown in FIG. 4, the commutation current (the currents ia and id) can be stabilized before the next commutation starts, whereby variations in current and torque in the brushless motor can be restrained to suppress noise.

Figure 3:
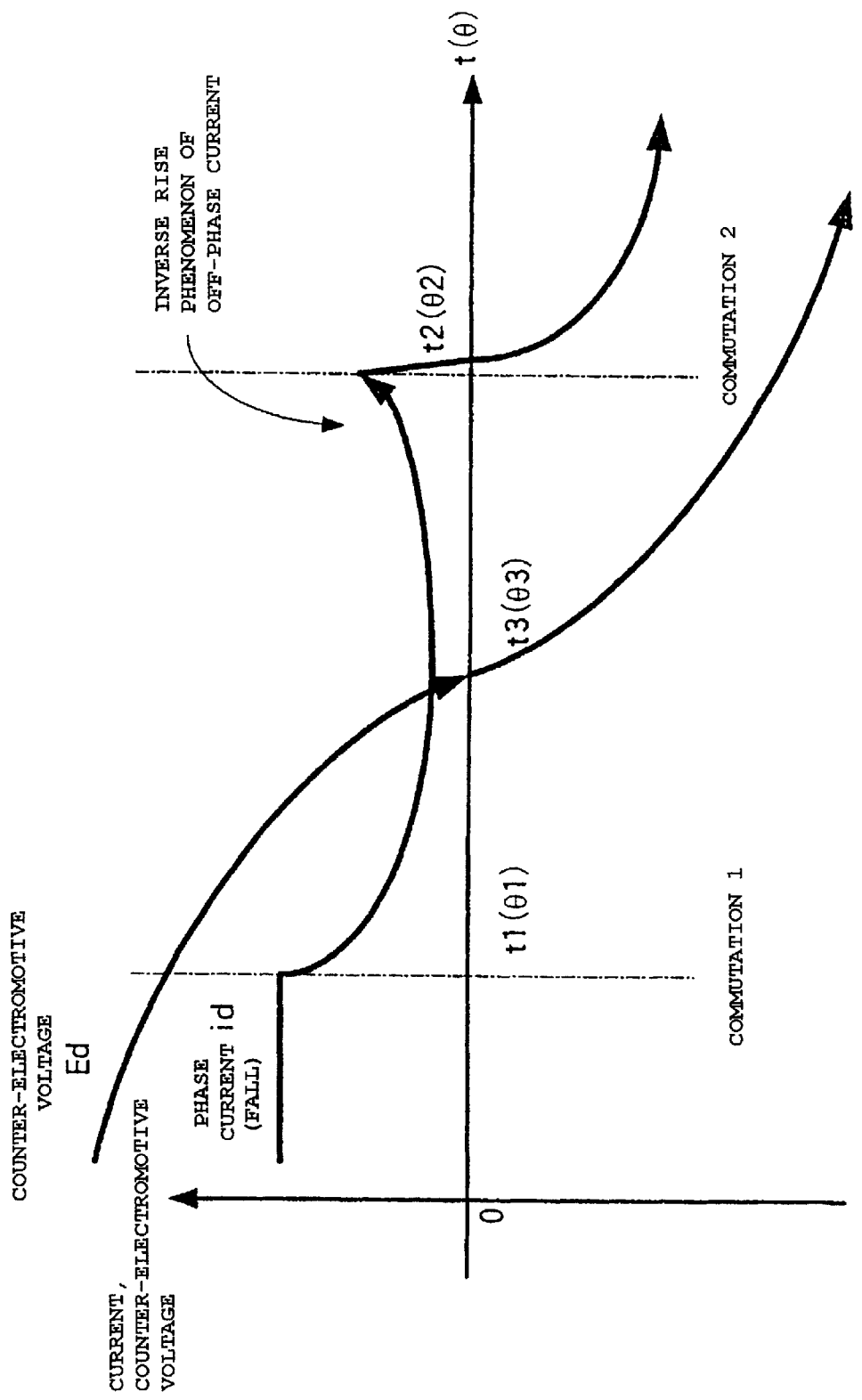
FIG. 3 is a waveform diagram showing one example of an OFF-phase current variation in a prior art brushless motor.

Moreover, the brushless motor and the driving control device therefor according to the present invention are constructed to control the commutation transient time by commutation-phase current control using the rotational speed or the rotational electrical angle of the brushless motor as a variable, thereby terminating the commutation transient time within ½ of the commutation interval time, whereby even while the brushless motor is rotating at high speed, the variation rates of a rise-phase current and a fall-phase current can be made coincident with each other. In addition, by terminating the commutation transient process before the polarity of an OFF-phase counter-electromotive voltage changes, it is possible to prevent the rising phenomenon of an OFF-phase current as shown in FIG. 3, whereby variations in the current and torque of the brushless motor can be restrained to suppress noise and to prevent the lowering of the output torque of the brushless motor. Accordingly, even if the brushless motor and the driving control device therefor according to the invention are applied to a torque assist device for an electrically-operated power steering system, it is possible to eliminate viscous steering feeling.

In addition, the driving control device for the brushless motor according to the present invention can hold an OFF-phase current at zero after an OFF-phase energization interval by limiting the interval(energization interval) during which to supply a driving current for a fall phase of the commutation phase of an excitation coil, whereby it is possible to prevent the phenomenon that the fall-phase phase current id contrarily rises as shown in FIG. 3, thereby restraining the occurrence of current variations, torque variations and noise in the brushless motor.

An embodiment of the present invention will be described below with reference to the accompanying drawings.

Figure 5:
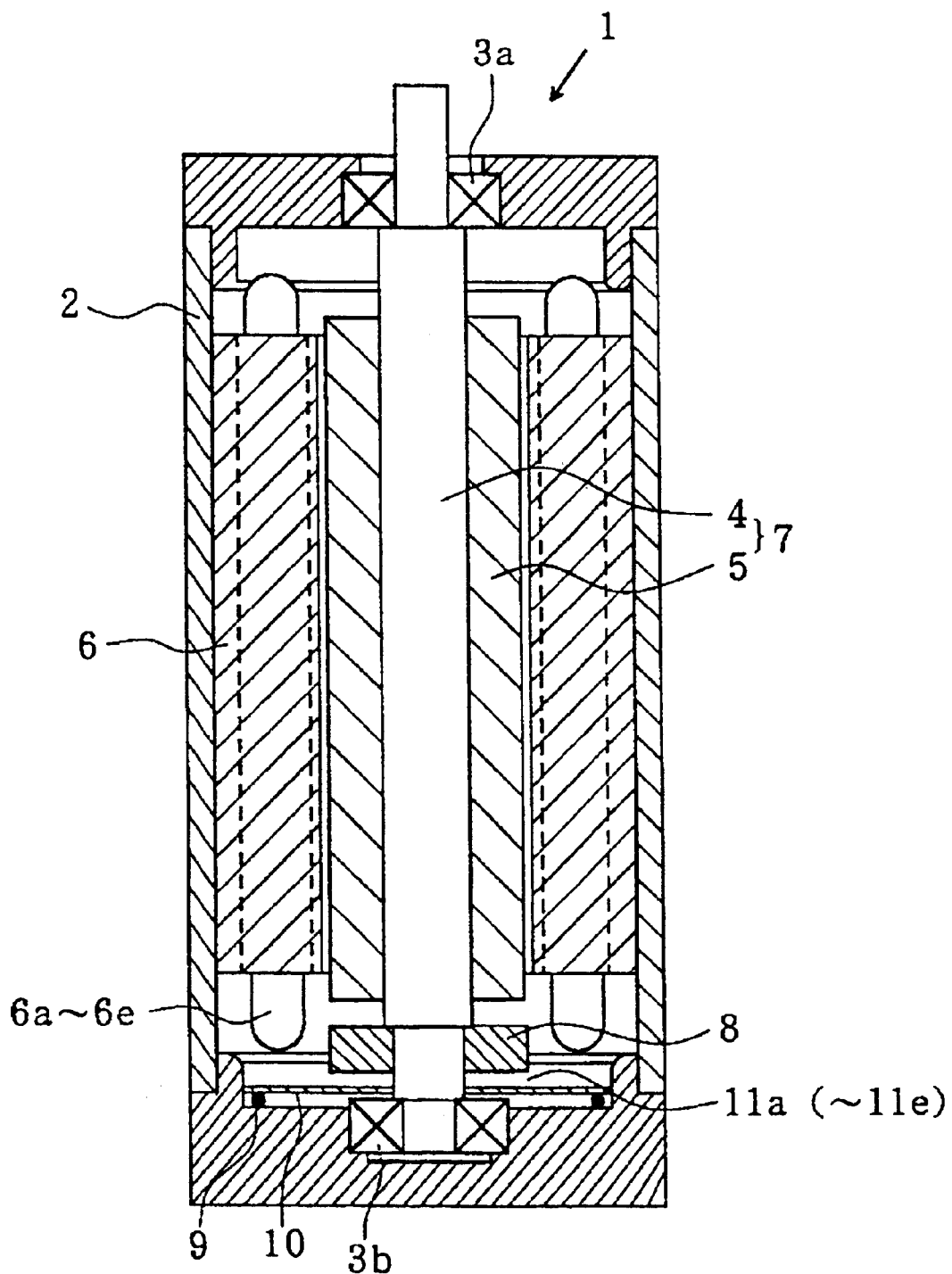
FIG. 5 is a cross-sectional view of a 5-phase brushless motor according to the embodiment of the present invention.

FIG. 5 is a longitudinal sectional view showing an internal structure of a 5-phase brushless motor which is one example of a brushless motor which is a motor according to the present invention and is driven and controlled by a driving control device for the motor. This 5-phase brushless motor 1 includes a cylindrical housing 2, a rotating shaft 4 which is disposed along the axis of the housing 2 and is rotatably supported by bearings 3a and 3b, a permanent magnet 5 which is secured to the rotating shaft 4, and a stator 6 which is secured to the inner surface of the housing 2 in such a manner as to surround the permanent magnet 5 and around which 5-phase excitation coils 6a, 6b, 6c, 6d and 6e are wound. The rotating shaft 4 and the permanent magnet 5 constitute a rotor 7.

A ring-shaped permanent magnet 8 for phase detection is secured to the rotating shaft 4 of the rotor 7 in the vicinity of one end thereof, and the permanent magnet 8 is magnetized so that S- and N-poles alternate in the circumferential direction and are spaced circumferentially equally apart. The permanent magnet 5 of the rotor 7 is also magnetized so that S- and N-poles alternate in the circumferential direction and are spaced circumferentially equally apart. A support substrate 10 made of a ring-shaped thin sheet is disposed via a stay 9 at one end face of the housing 2 on the side where the bearing 3b is disposed, in such a manner that the inside insulating portion of the support substrate 10 is opposed to the permanent magnet 8. Phase detecting elements 11 each made of, for example, a Hall element are secured to one surface of the support substrate 10 on the same side as the permanent magnet 8 in such a manner as to be opposed to the permanent magnet 8. Actually, five phase detecting elements 11(11a–11e) are provided in the state of being spaced circumferentially appropriately apart to correspond to the driving timing of the excitation coils 6a–6e, but FIG. 5 shows only one of the phase detecting elements 11a–11e.

The phase detecting elements 11a–11e output H-level sensor signals as their position detection signals when the magnetic poles of the permanent magnet 8 that oppose the respective phase detecting elements 11a–11e are the N-poles, or output L-level sensor signals as their position detection signals when such magnetic poles are the S poles. The rotational position of the rotor 7 can be detected by utilizing the fact that the outputs of the phase detecting elements 11a–11e vary according to the respective opposing magnetic poles of the permanent magnet 8. According to the rotational position, a motor driving control device 20(FIG. 6) which will be described later rotationally drives the rotor 7 by a 4-phase excitation method, which switches the excitation coils 6a, 6b, 6c, 6d and 6e to be energized, sequentially from phase to phase, while simultaneously energizing four phases from among the 5-phase excitation coils 6a, 6b, 6c, 6d and 6e.

Figure 6:
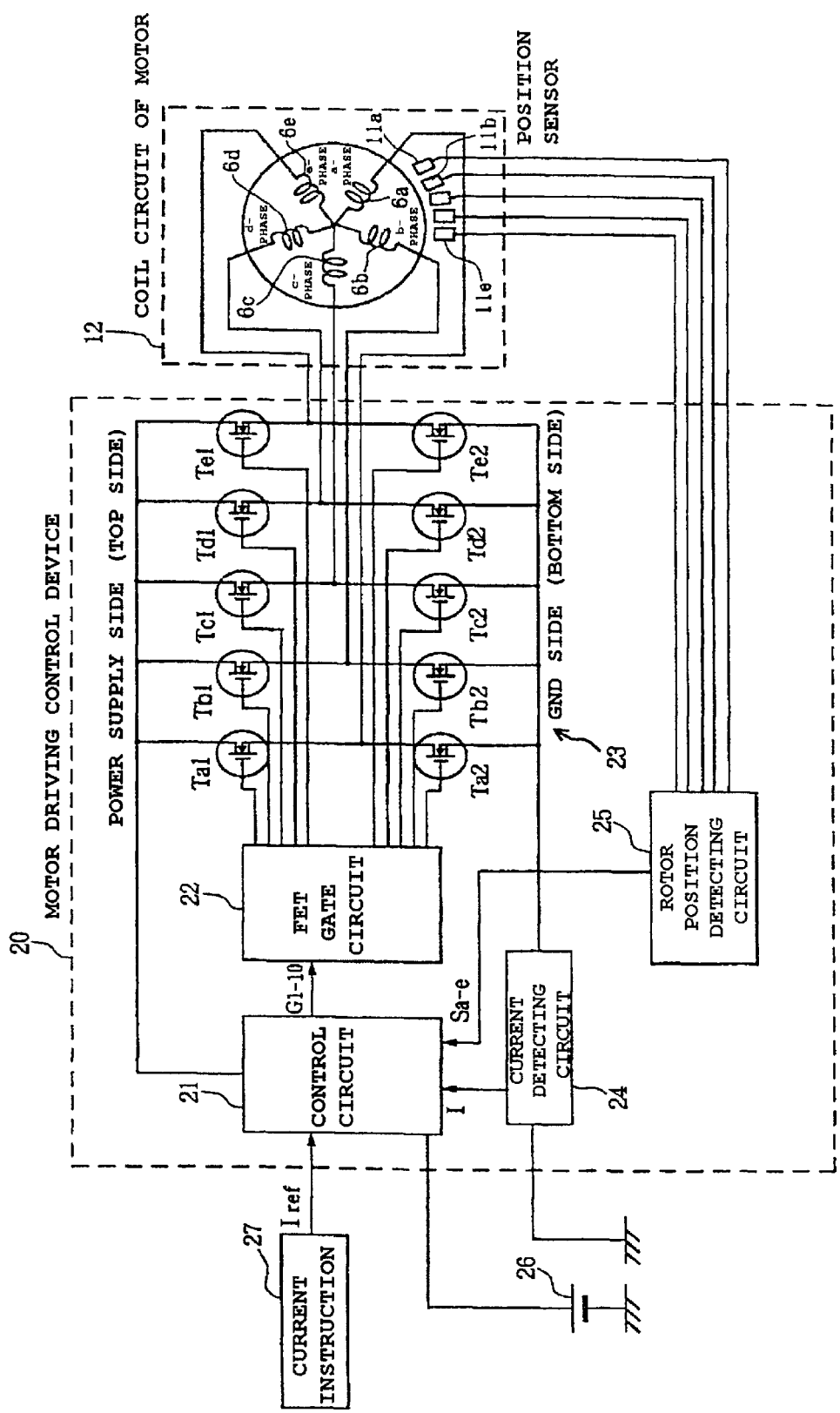
FIG. 6 is a circuit diagram showing the motor driving control device according to the embodiment of the present invention.

The 5-phase excitation coils 6a, 6b, 6c, 6d and 6e are disposed to surround the outer circumferential surface of the rotor 7 in the state of being spaced apart by an electrical angle of 72 degrees, and are interconnected by a Y-shaped star connection as shown in FIG. 6, thereby constituting a coil circuit 12 of the motor. Incidentally, in the 4-phase excitation method, the motor current flows in four phases, but since current is inversely proportional to coil resistance, the coil resistances of the respective excitation coils 6a, 6b, 6c, 6d and 6e are formed to be all equal so that currents can flow in the respective phases with good balance. The stator 6 has thirty slots spaced equally apart around the inner surface of its stator core(not shown) as well as the same number of projections disposed among these slots. The projections are grouped into plural sets each made of five projections, and the excitation coils 6a, 6b, 6c, 6d and 6e are respectively wound around the sets. Each of the excitation coils 6a, 6b, 6c, 6d and 6e is connected to the others at one end, and their other ends are connected to the motor driving control device 20.

The motor driving control device 20 includes, as shown in FIG. 6, a control circuit 21, an FET gate driving circuit 22, a motor driving circuit 23, a current detecting circuit 24 and a rotor position detecting circuit 25. The control circuit 21 corresponds to a control part in the invention, and the FET gate driving circuit 22 and the motor driving circuit 23 correspond to a driving part. The control circuit 21 is made of, for example, a microcomputer, and is supplied with a constant voltage from a constant voltage source 26. The control circuit 21 receives a current instruction Iref from an external circuit 27, a motor current detection value I from the current detecting circuit 24, and a rotor position signal Sa–e (=Sa, . . . , Se) from the rotor position detecting circuit 25. On the basis of these input signals, the control circuit 21 controls driving currents to be supplied to the coil circuit 12 of the motor from the motor driving circuit 23.

In the case where the 5-phase brushless motor is used as a drive source for the previously-described electrically-operated power steering system, the external circuit 27 is constructed to search for a motor current value with reference to a characteristic chart on the basis of a vehicle speed detection value V and a detection value T containing the direction of torque and output the motor current value as the current instruction Iref, the vehicle speed detection value V being found from the output of a vehicle speed sensor which generates a pulse signal according to the rotational speed of the output shaft of the transmission of the automobile, and the detection value T being found from the output of a torque sensor for detecting a steering torque applied to the input shaft of a steering wheel. The external circuit 27 can be constructed of a circuit such as a CPU which executes the above-described operation, but instead of the external circuit 27, the control circuit 21 may be constructed so that the outputs of the respective vehicle speed sensor and torque sensor are inputted to the control circuit 21, in which the current instruction Iref is generated.

The motor driving circuit 23 is made of five transistors arranged on a power supply side(top side) and five transistors arranged on a grounding side(bottom side), a total of ten transistors (field effect transistors) Ta1 to Te1 and Ta2 to Te2. From among these ten transistors Ta1 to Te1 and Ta2 to Te2, each of the top-side transistors Ta1 to Te1 and the corresponding one of the bottom-side transistors Ta2 to Te2 are connected in series, and the top-side and bottom-side terminals of each of these series-connected transistor pairs (Ta1–Ta2, Tb1–Tb2, Tc1–Tc2, Td1–Td2 and Te1–Te2) are connected to the control circuit 21 and the current detecting circuit 24, respectively. The connections of the respective transistor pairs are connected to the external ends of the corresponding excitation coils 6a to 6e(the opposite sides to the center of the star connection). The gate voltage of each of the transistors Ta1 to Te2 is controlled by the control circuit 21 on the basis of a detection signal Sa–e from the rotor position detecting circuit 25.

Figure 1:
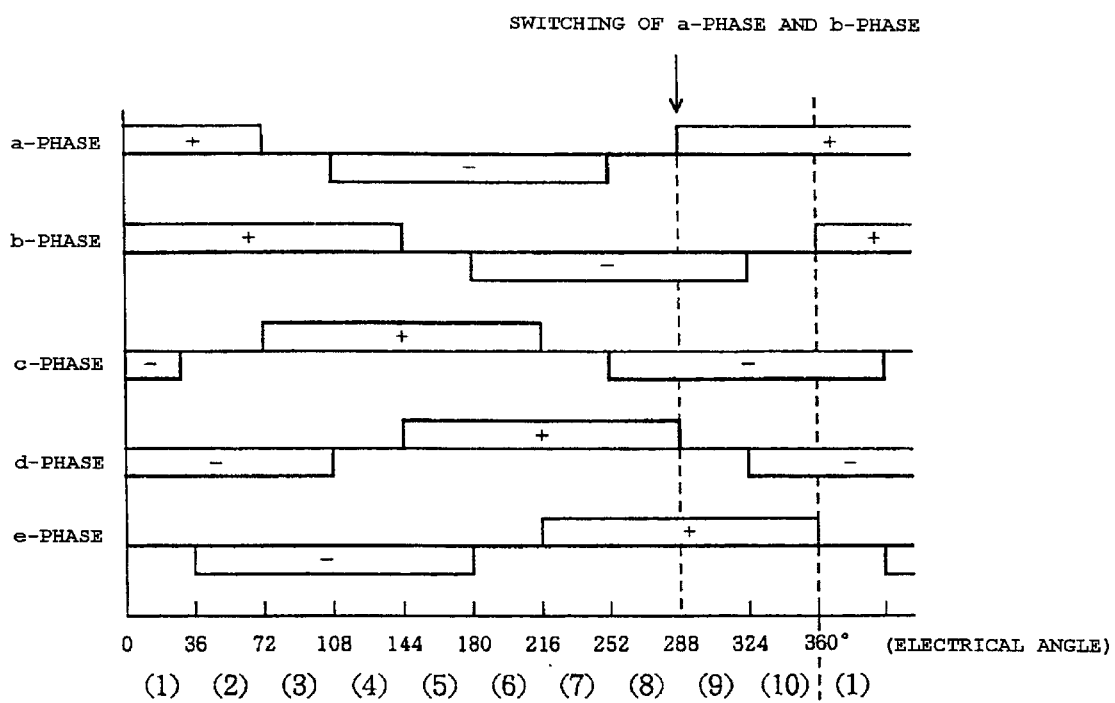
FIG. 1 is a waveform diagram showing an example of an excitation current of each phase in the 5-phase brushless motor.
Figure 2:
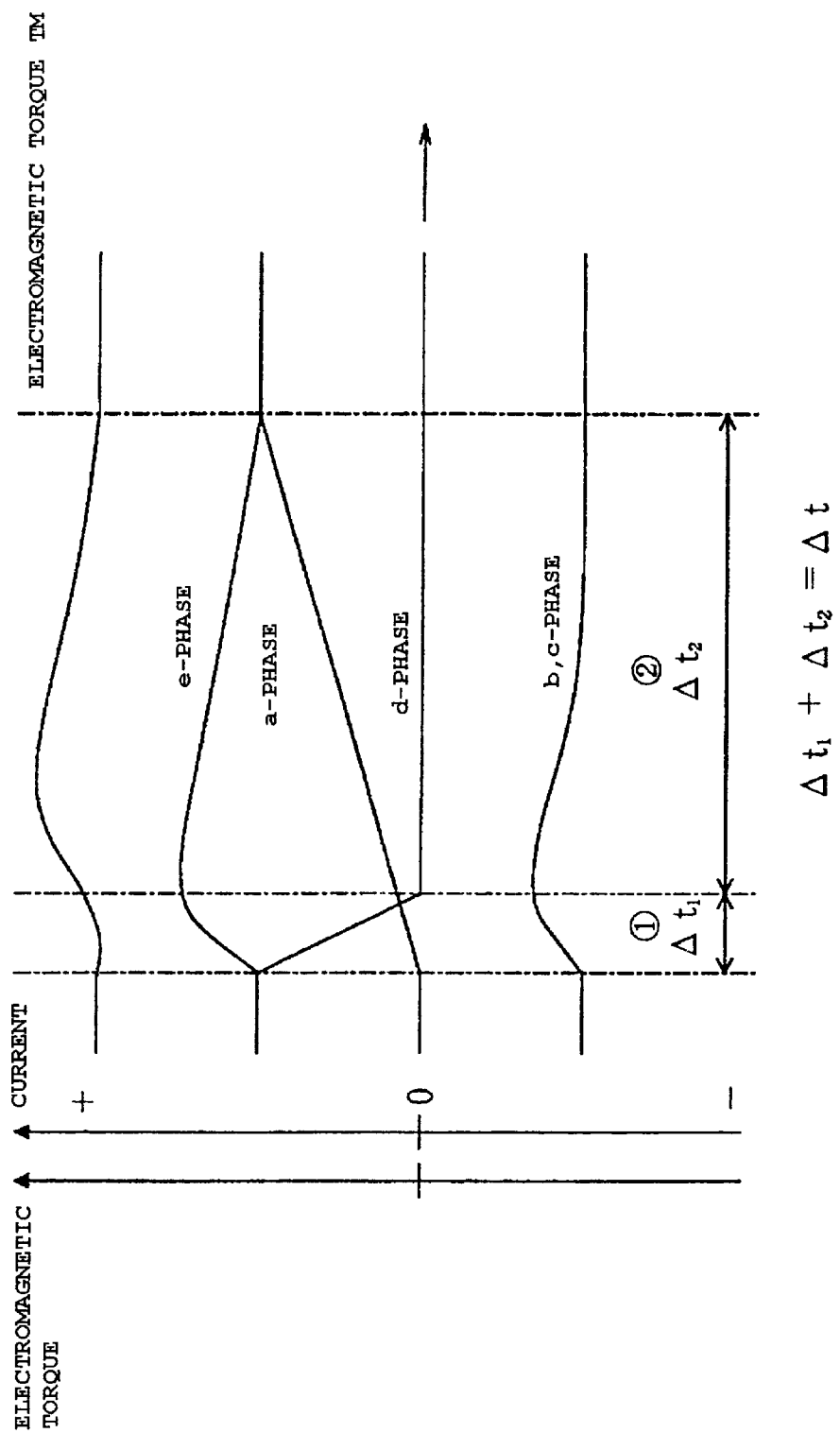
FIG. 2 is a waveform diagram showing one example of a current variation and magnetic torque variation of each phase at the time of switching of excitation currents in a prior art.

The direction and magnitude of excitation current to be supplied to each of the excitation coils 6a to 6e from the motor driving circuit 23 are basically similar to prior art examples, as shown in FIG. 1, and the on/off timings of the respective transistors Ta1 to Te2 are as shown by gate signals(top side) Ga1 to Ge1 and gate signals(bottom side) Ga2 to Ge2 in Table 1 described below. In Table 1, the gate signals Ga1 to Ge2 which turn on/off the respective transistors Ta1 to Te2 are represented as "1" and "0".

thereof. In this manner, magnetic attractions and repulsions are produced between the N- or S-poles of the rotor 7 and N or S poles which occur around such N- or S-poles, whereby the rotor 7 rotates. Then, the rotor 7 shifts to the state of Interval (2) of FIG. 1. This state corresponds to Interval (2) of Table 1, and the top-side transistors Ta1 and Tb1 and the bottom-side transistors Td2 and Te2 are turned on and the other transistors are turned off, whereby currents flow through the excitation coils 6a and 6b from the external ends thereof, while currents flow through the excitation coils 6d and 6e from the connection thereof. Thus, the rotor 7 rotates to a further extent.

As the above-described operation is repeatedly performed, the transistors Ta1 to Te2 are driven at the timing shown in Table 1 and, as shown in FIG. 1, the excitation coils 6a, 6b, 6c, 6d and 6e to be energized are switched sequentially from phase to phase at intervals of an electrical angle of 36 degrees, thereby exciting one phase through an electrical angle of 144 degrees. Thus, N- or S-poles which occur in the stator 6 shift sequentially and the rotor 7 continuously rotates. The FET gate driving circuit 22 supplies a predetermined voltage to the gate terminals of specified transistors on the basis of a gate driving signal G1–10 outputted from the control circuit 21.

The above description of the embodiment has referred to an example in which the invention is applied to a 5-phase brushless motor, but the present invention is not limited to this example and can be applied to various other brushless motors having different plural excitation phases(for example, three phases). In addition, as shown in FIG. 1, the above description of the embodiment has referred to an example in which a top-side transistor(for example, Ta1) and a bottom-side transistor(for example, Ta2) are driven with the same PWM duty, but the invention is not limited to this example and can be applied to an example in which a top-side transistor(for example, Ta1) and a bottom-side transistor(for example, Ta2) are driven with different PWM duties.

The main construction of the embodiment of the present invention will be described below in detail.

First of all, variations in current and torque during high-speed rotations of a motor will be described below. As

TABLE 1

| | POSITION DETECTION SIGNAL | | | | | GATE SIGNAL (TOP SIDE) | | | | | GATE SIGNAL (TOP SIDE) | | | | |
|---|---|---|---|---|---|---|---|---|---|---|---|---|---|---|---|
| INTERVAL | Sa | Sb | Sc | Sd | Se | Ga1 | Gb1 | Gc1 | Gd1 | Ge1 | Ga2 | Gb2 | Gc2 | Gd2 | Ge2 |
| (1) | H | H | L | H | L | 1 | 1 | 0 | 0 | 0 | 0 | 0 | 1 | 1 | 0 |
| (2) | H | L | L | H | L | 1 | 1 | 0 | 0 | 0 | 0 | 0 | 0 | 1 | 1 |
| (3) | H | L | H | H | L | 0 | 1 | 1 | 0 | 0 | 0 | 0 | 0 | 1 | 1 |
| (4) | H | L | H | L | L | 0 | 1 | 1 | 0 | 0 | 1 | 0 | 0 | 0 | 1 |
| (5) | H | L | H | L | H | 0 | 0 | 1 | 1 | 0 | 1 | 0 | 0 | 0 | 1 |
| (6) | L | L | H | L | H | 0 | 0 | 1 | 1 | 0 | 1 | 1 | 0 | 0 | 0 |
| (7) | L | H | H | L | H | 0 | 0 | 0 | 1 | 1 | 1 | 1 | 0 | 0 | 0 |
| (8) | L | H | L | L | H | 0 | 0 | 0 | 1 | 1 | 0 | 1 | 1 | 0 | 0 |
| (9) | L | H | L | H | H | 1 | 0 | 0 | 0 | 1 | 0 | 1 | 1 | 0 | 0 |
| (10) | L | H | L | H | L | 1 | 0 | 0 | 0 | 1 | 0 | 0 | 1 | 1 | 0 |

If the rotor 7 is in the state of, for example, Interval (1) in FIG. 1, this state corresponds to Interval (1) of Table 1. Since the top-side transistors Ta1 and Tb1 and the bottom-side transistors Tc2 and Td2 are turned on and the other transistors are turned off, currents flow through the excitation coils 6a and 6b from the external ends thereof, while currents flow through the excitation coils 6c and 6d from the connection described above, in the case where the current variation rate during commutation is controlled, the transient process of current during commutation requires time which is about 3 times the electrical time constant of the motor and a motor driving circuit. During a high-speed rotation of the motor, in the case where the electrical time constant becomes large and the transient process of a commutation cannot be terminated until the next commutation starts, the waveforms of phase currents become as shown in FIG. 3.

Between the two commutation timings shown in FIG. 3, the polarity of an OFF-phase counter-electromotive voltage Ed changes (for example, Ed>0→Ed<0), so that an OFF-phase phase current id does not fall to "0" and contrarily rises. In addition, even if the polarity of the OFF-phase counter-electromotive voltage Ed does not change, if a voltage to be supplied to the OFF phase does not change according to a variation in the counter-electromotive voltage Ed when the magnitude of the counter-electromotive voltage Ed changes, there will occur a case in which the OFF-phase phase current id does not fall to "0" and contrarily rises as shown in FIG. 3. If the total current $(Id=i_d+i_a+i_e=-(i_b+i_c))$ of the motor is constant, the top-side currents out of the OFF-phase ($i_a$ and $i_e$) will become lower than their original target values. Therefore, the currents of the respective phases of the motor vary and the torque also varies.

In the case of a 5-phase brushless DC motor(BLDCM), the counter-electromotive voltage does not become a trapezoidal wave of 144 degrees (electrical angle) or more owing to the shape of the magnetization waveform, the manner of winding the windings and the skew angle, so that electromagnetic torques produced by currents of the respective phases vary due to variations in the current waveforms of the respective phases. As a result, the total output torque of the motor also varies. This variation in the output torque of the motor causes noise.

In addition, while an OFF-phase current is rising, the output torque of the motor may becomes low with respect to its constant motor current, since there is a possibility that the electromagnetic torque produced in the OFF-phase becomes a negative torque or decreases. The amount of lowering of the torque relates to the magnitude of the rising current. The magnitude of the rising current relates to the rotational speed of the motor, counter-electromotive voltage of commutation phase, and the electrical time constant of the motor and the motor driving circuit. In the case where the electrical time constant of the motor is constant, when the rotational speed of the motor becomes fast to some extent, the rising phenomenon of OFF-phase current occurs, and as the rotational speed becomes far faster, the amount of variation in OFF-phase counter-electromotive voltage becomes larger during a commutation interval and the magnitude of the rising current becomes larger, so that the amount of lowering of the output torque of the motor becomes larger. If such a motor is used as an assist motor for an electrically-operated power steering system, an operator will have a heavy or viscous steering feeling.

Countermeasure methods 1 and 2 relative to the problem of variations in current and torque during the high-speed rotation of the motor will be described below.

A. Countermeasure Method 1:

The electrical time constant of the motor and the motor driving circuit is made small so that within a target rotational speed of the motor, an OFF-phase current can terminate the transient process of a commutation before the next commutation starts, i.e., before the polarity of an OFF-phase counter-electromotive voltage changes. In addition, the interval of OFF-phase energization is limited to complete OFF-phase energization at an appropriate timing before the polarity of the counter-electromotive voltage changes, thereby preventing the rising phenomenon of OFF-phase current. For example, in the case of a p-pole/m-phase brushless DC motor, commutation interval time T2 for a rotational speed n (rpm) is found from the following expression (6):

$$T2=60/(n\times 2p\times m)=30/(n\times p\times m)[sec] \qquad (6)$$

During the commutation, assuming that counter-electromotive voltage of commutation phase, PWM-duty of that phase and the power source voltage of an inverter are constant, the transient characteristic of current of that phase becomes the same as a first-order lag. Therefore, transient process time T1 of the commutation is made about three times an electrical time constant T of the motor and the motor driving circuit, as shown by the following expression (7):

$$T1\approx 3T \qquad (7)$$

To prevent the occurrence of the rising phenomenon of OFF-phase current, the transient process time T1 of commutation needs to be made ½ or less of the commutation interval time T2. By substituting the expressions (6) and (7) into T1<T2/2, the electrical time constant T of the motor and the motor driving circuit can be found from the following expression (8):

$$T<T2/6=5/(n\times p\times m)[sec] \qquad (8)$$

If the electrical time constants T of specific examples of a motor and a motor driving circuit are calculated by using the expression (8), in the case of a 2-pole/5-phase brushless DC motor with a rotational speed of 500 [rpm], the electrical time constant T becomes T<1 [msec], or in the case of a 3-pole/3-phase brushless DC motor with a rotational speed of 1,500 [rpm], the electrical time constant T becomes T<0.37 [msec], or in the case of a 2-pole/5-phase brushless DC motor with a rotational speed of 1,500 [rpm], the electrical time constant T becomes T<0.56 [msec].

The electrical time constant T of the motor and the motor driving circuit is set by using the expression (8) and the resultant OFF-phase energization interval is limited, whereby the rising phenomenon of OFF-phase current can be prevented and reductions in current and torque variations and noise can be realized. If this motor is to be used as an assist device for an electrically-operated power steering system, the operator will have no viscous steering feeling.

Figure 7:
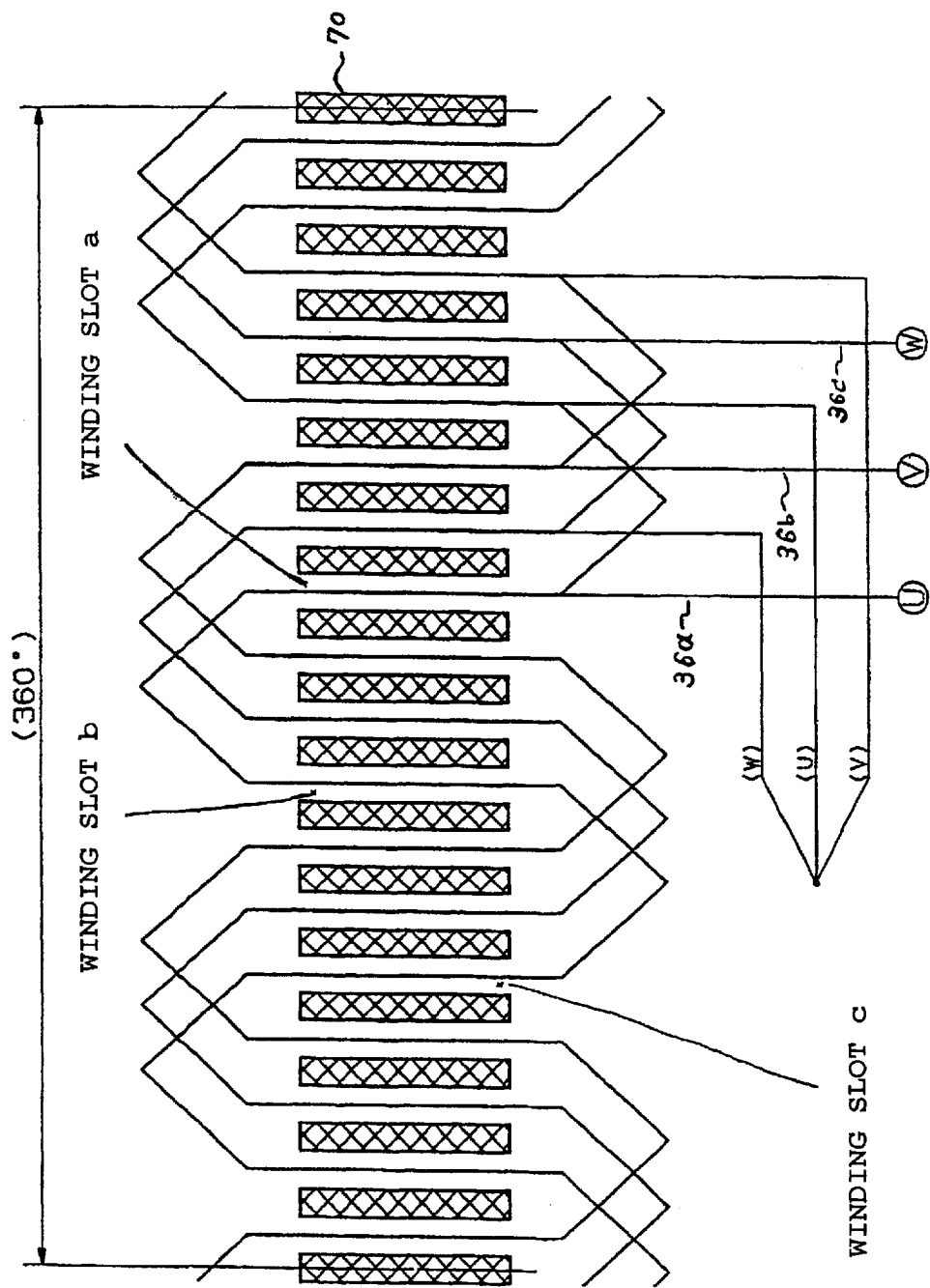
FIG. 7 is an explanatory view showing a first manner of winding the windings of the brushless motor according to the embodiment of the present invention.
Figure 8:
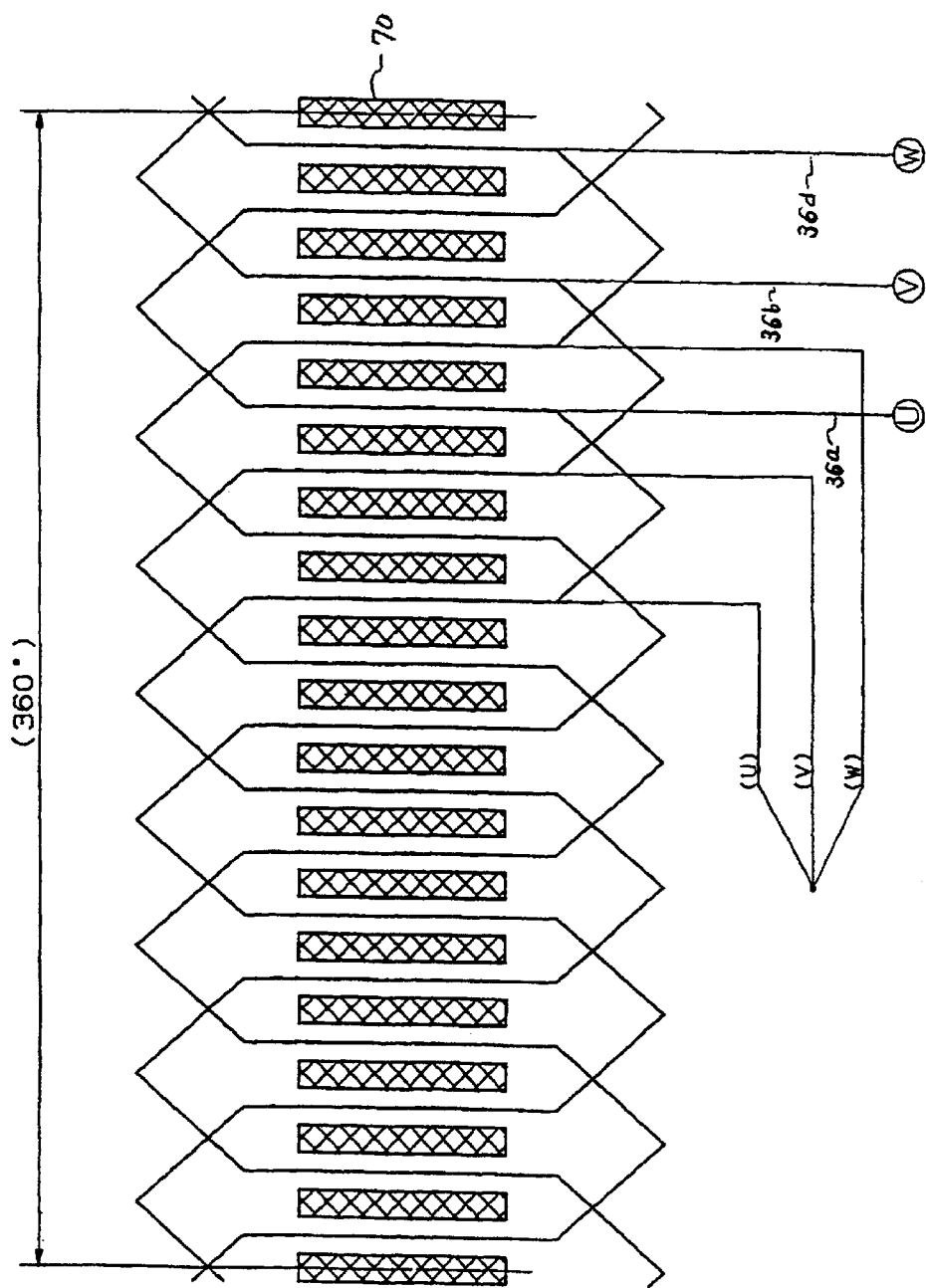
FIG. 8 is an explanatory view showing a second manner of winding the windings of the brushless motor according to the embodiment of the present invention.

According to the specific examples, as the rotational speed, the number of poles or the number of phases of a motor become larger, the electrical time constant T of the motor and the motor driving circuit needs to be made small. However, from the viewpoint of energy saving and an improvement in system efficiency, the extent to which to increase the resistance of the motor driving circuit and the winding resistance of the motor is restricted, and it is desirable to decrease the inductance. The decrease of the inductance depends on the magnetic circuit design of the motor and the manner of winding the windings. For example, regarding the manner of winding the windings, which is one method of decreasing the inductance, the windings of a 3-phase motor are wound in a wave-winding manner, as shown in FIGS. 7 and 8. The windings of a 5-phase motor are wound in a manner such as that shown in FIG. 9.

Figure 9:
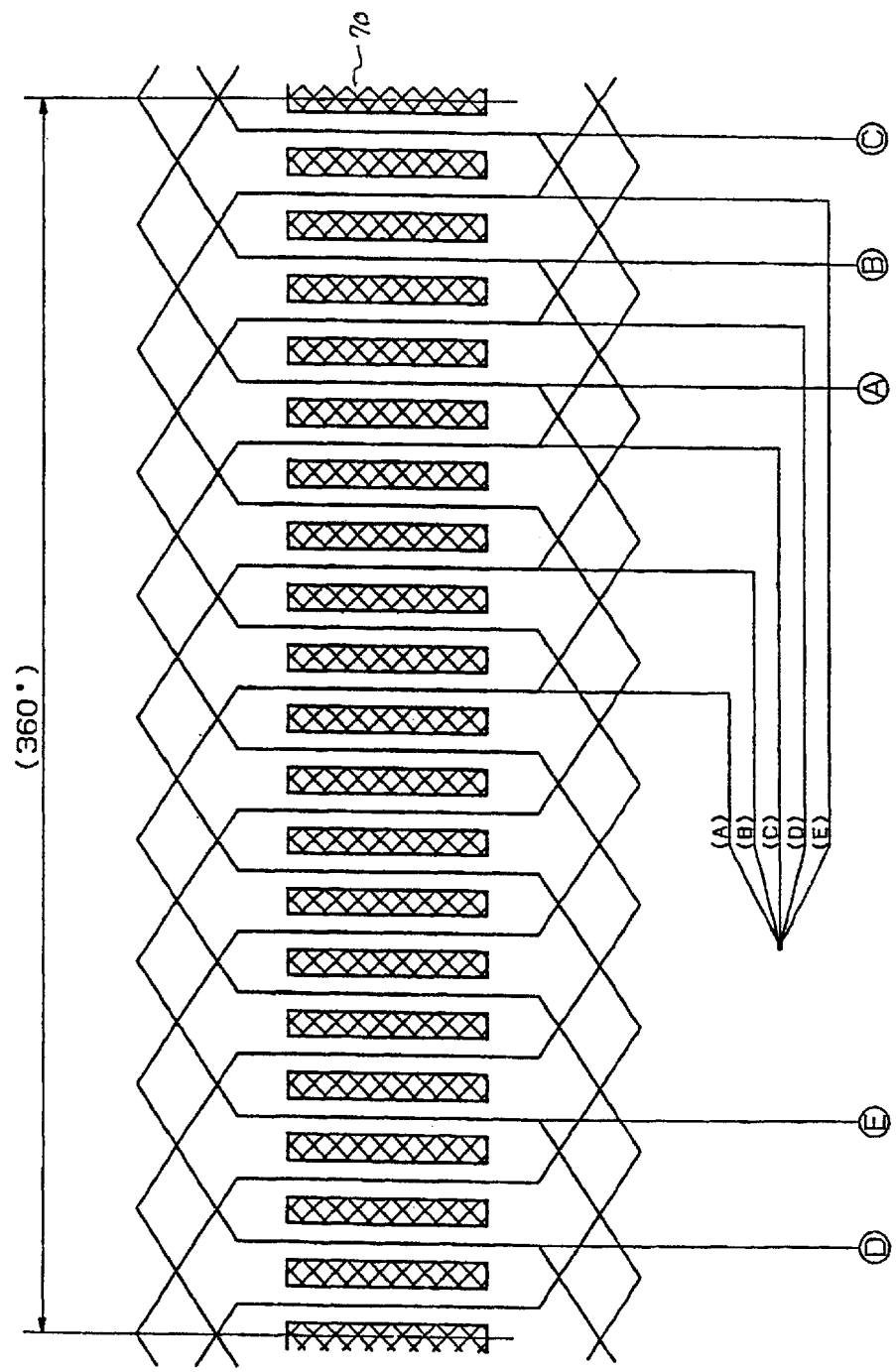
FIG. 9 is an explanatory view showing a third manner of winding the windings of the brushless motor according to the embodiment of the present invention.

FIGS. 7 to 9 are developed views of the windings of a brushless DC motor according to the embodiment of the present invention. FIGS. 7 and 8 show examples of the windings of a 3-phase 6-pole brushless motor. One excitation coil winding 36a(U-phase) is wound in the following manner. The coil 36a is passed through a winding slot "a" and then through a winding slot "b" spaced apart from the winding slot "a" by a slot pitch equivalent to the number of phases, thereby being passed back and forth through the slots between teeth 70, and then is passed through the next winding slot "c" at the same pitch and subsequently is passed around the stator 6 and back to the initial winding slot "a". Then, the excitation coil 36a is further passed along the same locus and is similarly passed around the stator 6 back to the initial winding slot "a". This winding is repeated to set the excitation coil 36a as well as excitation coils 36b and 36c to predetermined numbers of conductors.

Such an excitation coil 36 may be made of one wire material, or may also be made of a bundle of several wire materials. In the brushless DC motor, since the excitation coil 36 is not formed in a loop-like shape as shown in FIGS. 7 to 9, the number of turns of the excitation coil which influences the inductance of the motor is "0", and the self-inductance of the brushless DC motor is extremely small. In addition, in the brushless DC motor, since the number of conductors is the same as that of prior art lap winding, the electrical resistance of the excitation coil is approximately the same as that of lap winding, and only the inductance is made small.

In the magnetic circuit design of the embodiment, the inductances of the coils are decreased by improving the magnetic resistances of the magnetic circuits of the winding coils by increasing the gap between winding cores and the permanent magnet, or increasing the thickness of the magnet, or using a ferrite magnet in place of a rare earth magnet.

B. Countermeasure Method 2:

From the above expression (8), as the motor rotational speed n and the number p of pole pairs of magnetization become larger, the required electrical time constant becomes smaller. Since the resistance of the circuit cannot be increased when the efficiency of the system is taken into account, an inductance L of the motor needs to be made small. However, there is a possibility that the required inductance cannot be formed by limitations such as the output, torque constant and ratings of the motor. As a result, there may occur the problem that the transient process time of a commutation cannot be terminated within ½ of the commutation interval time. In addition, when the rotational speed of the motor is fast, the proportion of commutation interval time in commutation time becomes large and a counter-electromotive voltage of commutation phase greatly changes during a commutation interval. If the current variation rate of commutation phase is not controlled according to the magnitude of the counter-electromotive voltage of commutation phase, there will occur the problem that the transient process time of a commutation cannot be terminated within ½ of the commutation interval time.

In this case, it is necessary to control an OFF-phase current variation rate according to a variation in the OFF-phase counter-electromotive voltage, thereby cutting off an OFF-phase current before the polarity of the counter-electromotive voltage changes. Methods for this will be described below with reference to FIGS. 10 to 13.

Figure 10:
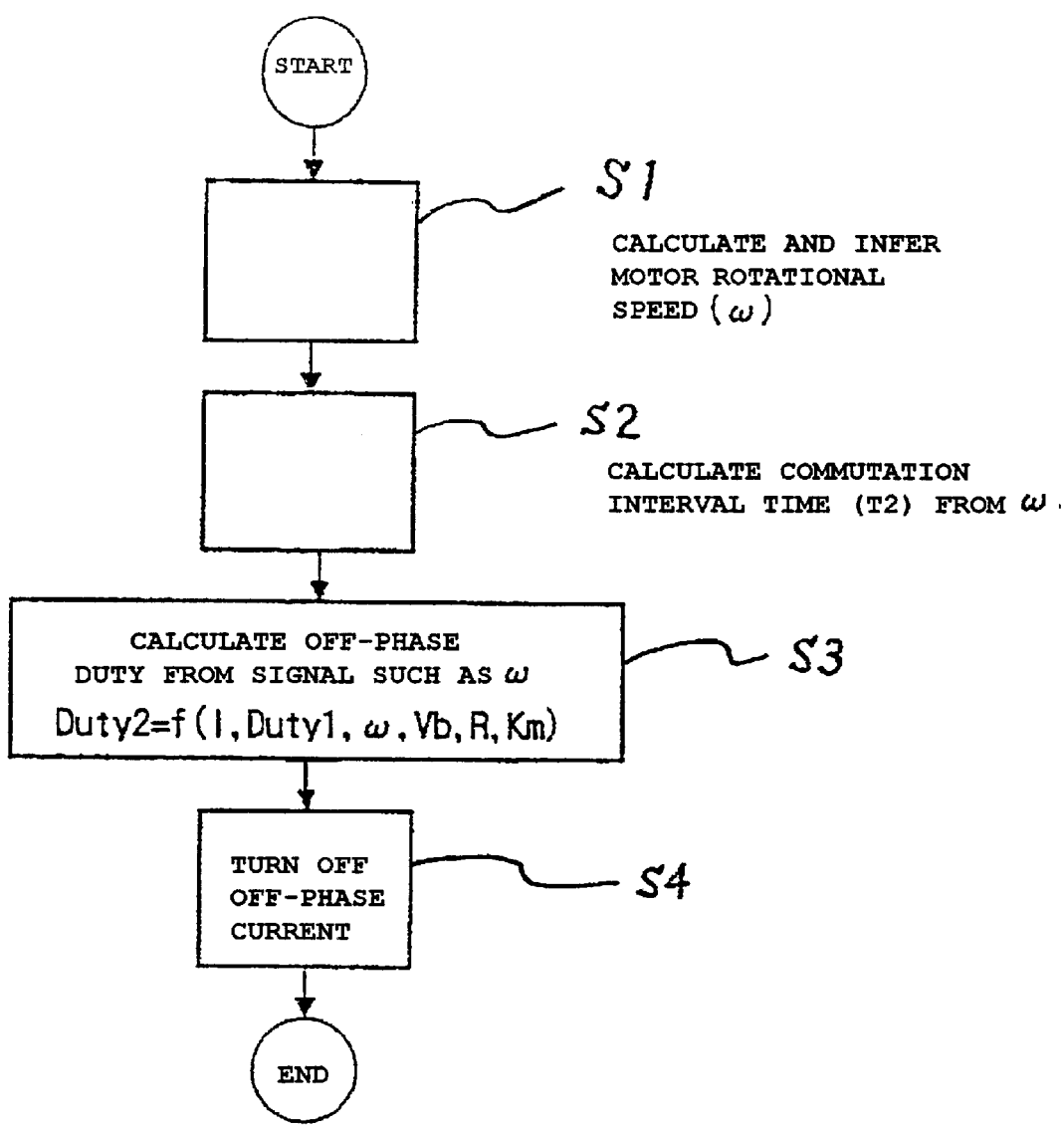
FIG. 10 is a flowchart showing a first method for cutting off an OFF-phase current before the polarity of a counter-electromotive voltage changes.

FIG. 10 is a flowchart showing a first method for cutting off an OFF-phase current before the polarity of a counter-electromotive voltage changes. First of all, the control circuit 21 measures and infers the rotational angular velocity ($\omega$) of the motor(Step S1), and calculates commutation interval time on the basis of the rotational angular velocity ($\omega$)(Step S2). The measurement and inference of the rotational angular velocity of the motor are executed by computing the rotation pulses or the rotational absolute position of the motor or by inferring the counter-electromotive voltage of the motor. After that, the control circuit 21 uses the rotational angular velocity $\omega$ of the motor as a variable, and changes a duty ratio Duty2 of a PWM signal to be given to the OFF-phase, as will be described below by way of example(Step S3).

The control circuit 21 computes the duty ratio Duty2 of the PWM signal to be given to the OFF-phase, from three signals, i.e., a motor current I, a duty ratio Duty1 of a PWM signal to be given to the ON-phase, and the rotational angular velocity $\omega$ of the motor. An expression for computing the duty ratio Duty2 is expressed by the function f shown in the following expression (9):

$$Duty2 = f(I, Duty1, \omega, Vb, R, Km) \tag{9}$$

An example of the function f will be described below. It is assumed that "Vb" represents a power source voltage to be supplied to the motor driving circuit 23 shown in FIG. 6 and "Vn" represents the voltage at the central connection point of excitation coils "a" to "e" (the merging point of individual phases, and Vn=(½)Vb. Letting Duty2 be the duty ratio of the PWM signal relative to a certain phase, a voltage equation for this phase becomes the following expression (10):

$$Duty2 = f(I, Duty1, \omega, Vb, R, Km) = 0.5 + Km \times \omega/2Vb \tag{10}$$

This expression (10) is modified into the following expression (11) and the duty ratio of the OFF-phase PWM signal is calculated(Step S3):

$$Duty2 = f(I, Duty1, \omega, Vb, R, Km) = 0.5 + g(\omega) \times Km \times \omega/2Vb \tag{11}$$

where "R" represents the coil resistance of each phase and "Km" represents the voltage constant[volt·sec] of the motor.

On the basis of the calculation of this duty ratio, the control circuit 21 controls the OFF-phase current variation rate to cause it to become as equal as possible to the rise-phase current variation rate, and also controls the transient process time of a commutation. The control circuit 21 turns off the OFF-phase current before half(t3) of the commutation interval time passes after the start of the commutation(t1)(Step S4).

Figure 11:
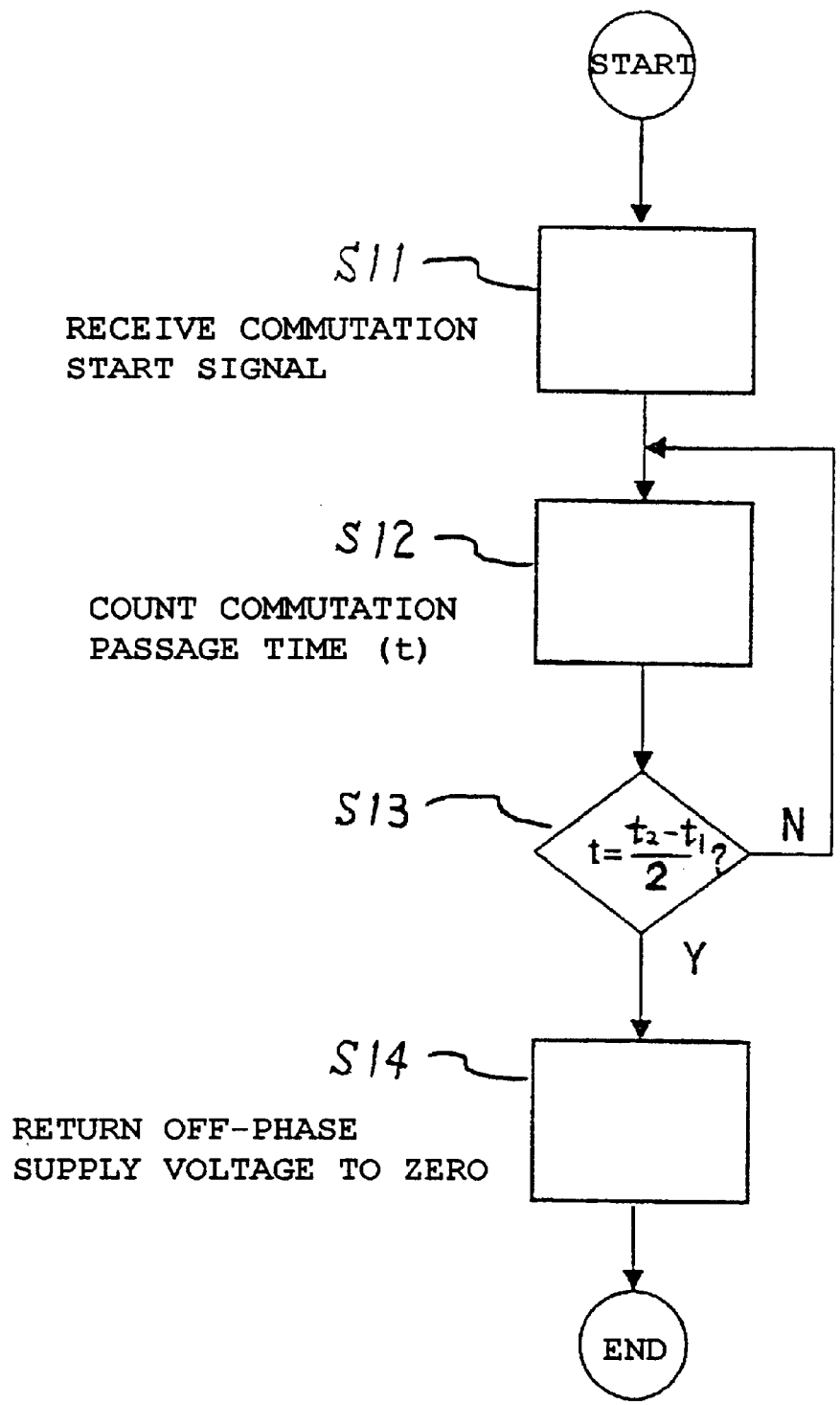
FIG. 11 is a flowchart showing a specific example of processing for turning off the OFF-phase current in the method shown in FIG. 10.

FIG. 11 is a flowchart showing a specific example of processing for turning off the OFF-phase current in the Step S4. First of all, when the control circuit 21 receives a commutation start signal(Step S11), the control circuit 21 counts commutation passage time(t)(Step S12). Then, the control circuit 21 determines whether the count value in the Step S12 has reached the transient process time(T1) of a target commutation(Step S13). If the control circuit 21 determines in the Step S13 that the count value has reached the transient process time ((t2−t1)/2) of the commutation, the control circuit 21 turns off the OFF-phase supply voltage (Step S14).

The following three methods a) to c) can be used to turn off the OFF-phase current.

a) The OFF-phase supply voltage(PWM driving duty) is made small according to a variation in the OFF-phase counter-electromotive voltage, whereby the current is decreased to "0" so that the current variation rates of rise phases and fall phases coincide with each other as completely as possible.

b) The OFF-phase supply voltage is reduced to "0", thereby forcedly decreasing the current to "0".

c) Both methods a) and b) are executed to decrease the current to "0".

Figure 12:
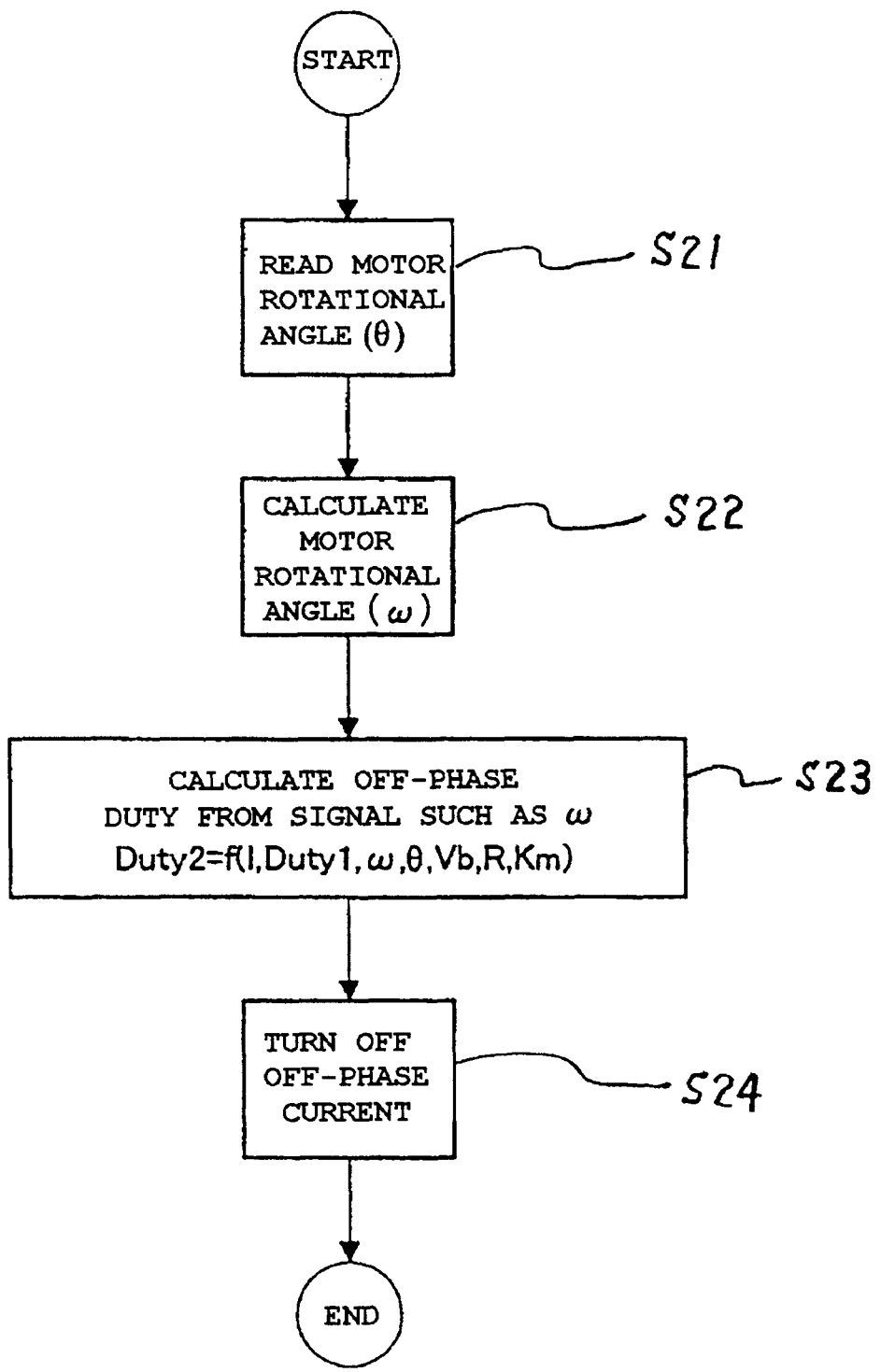
FIG. 12 is a flowchart showing a second method for cutting off an OFF-phase current before the polarity of a counter-electromotive voltage changes.
Figure 13:
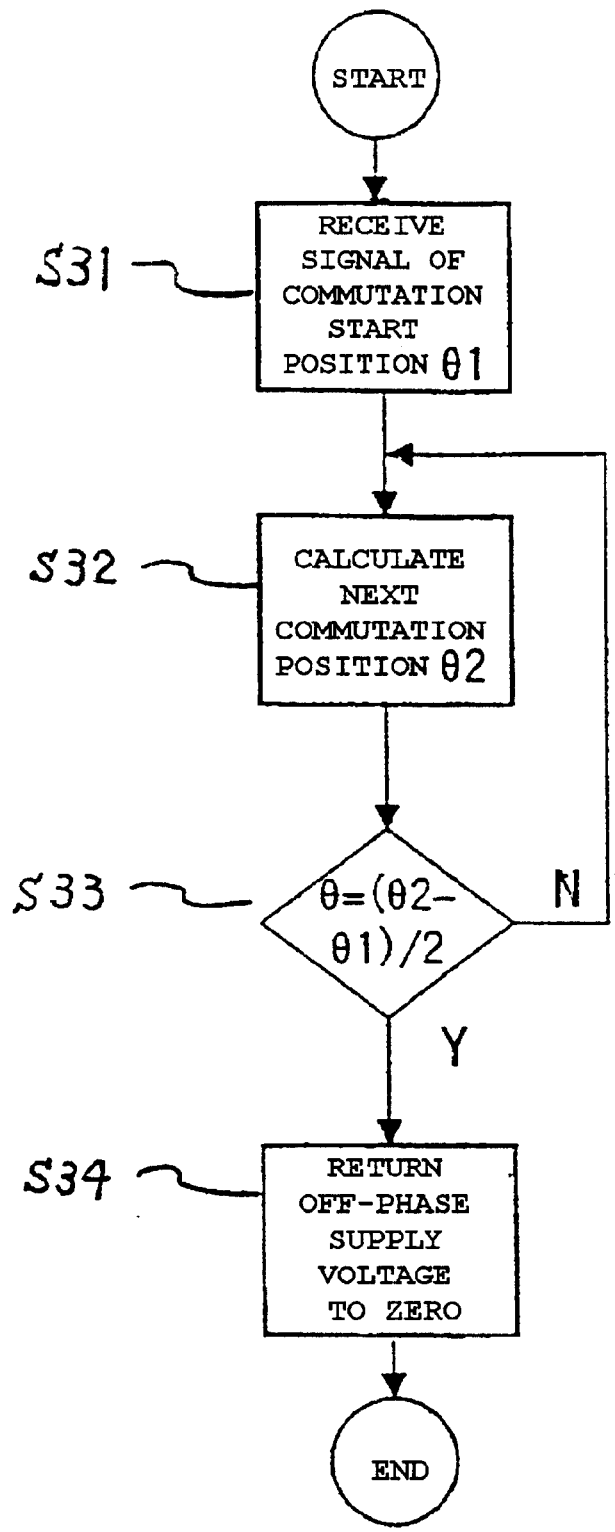
FIG. 13 is a flowchart showing a specific example of processing for turning off the OFF-phase current in the method shown in FIG. 12.

FIG. 12 is a flowchart showing a second method for cutting off an OFF-phase current before the polarity of a counter-electromotive voltage changes. First of all, the control circuit 21 measures the rotational electrical angle(θ) of the motor(Step S21), and calculates the rotational angular velocity(ω) of the motor on the basis of the rotational electrical angle(θ) (Step S22). After that, the control circuit 21 calculates the duty ratio Duty2 of the PWM signal to be given to the OFF-phase, not by using the following expression (12):

$$Duty2=f(I, Duty1, \omega, Vb, R, Km) =0.5+Km \times \omega/2Vb \qquad (12)$$

but by using the following expression (13)(Step S23):

$$Duty2=f(I, Duty1, \omega, \theta, Vb, R, Km) =0.5+g(\omega, \theta) \times Km \times \omega/2Vb \qquad (13)$$

On the basis of the calculation of this duty ratio, the control circuit 21 controls the OFF-phase current variation rate to cause it to become as equal as possible to the rise-phase current variation rate, and also controls the transient process time of a commutation. The control circuit 21 turns off the OFF-phase current before the polarity of the OFF-phase counter-electromotive voltage changes(Step S24).

FIG. 10 is a flowchart showing a specific example of processing for turning off the OFF-phase current in the Step S24. First of all, if the control circuit 21 receives a signal indicative of a rotational position θ1 of the motor at the starting time of the commutation(Step S31), the control circuit 21 calculates a rotational position θ2 of the motor relative to the next commutation on the basis of the rotational position θ1 of the motor(Step S32). Then, the control circuit 21 calculates a rotational position θ3 at which the polarity of the OFF-phase counter-electromotive voltage changes, by using the rotational position θ1 of the motor at the starting time of the commutation and the rotational position θ2 of the motor relative to the next commutation, and compares the rotational electrical angle θ of the motor at the present point of time and the rotational position θ3(Step S33). When the control circuit 21 determines that the rotational electrical angle θ of the motor at the present point of time and the rotational position θ3 have become equal to each other, the control circuit 21 reduces the OFF-phase supply voltage to "0" (Step S34), thereby turning off the OFF-phase current before the polarity of the OFF-phase counter-electromotive voltage changes.

As described above, according to the present invention, in a driving control device for a brushless motor having plural excitation phases, which device includes a current variation rate control part which controls a current variation rate during commutation(current variation rates of a rise phase and a fall phase), the current variation rate control part terminates commutation transient time which is the time for which phase currents are in a transient state during a commutation operation, within ½ of commutation interval time which is the time required from the starting time of a certain commutation until the starting time of the next commutation. Accordingly, by appropriately designing the electrical time constants of the motor and a motor driving circuit, the current variation rate control part can turn off an OFF-phase current before the polarity of an OFF-phase counter-electromotive voltage changes, thereby restraining the phenomenon that the OFF-phase current inversely rises, while maintaining the state in which the variation rates of currents of commutation phases are made as coincident as possible. Therefore, according to the invention, it is possible to restrain the occurrence of current variations, torque variations and noise in the brushless motor. Accordingly, if the brushless motor and the driving control device according to the invention are respectively used as an assist motor and a driving control device thereof in an electrically-operated power steering system, it is possible to construct an electrically-operated power steering system of low noise and good steering feeling.

What is claimed is:

1. A driving control device for a brushless motor having plural excitation phases, which device includes a current variation rate control part which controls a current variation rate during commutation, wherein the current variation rate control part terminates commutation transient time which is the time for which phase currents are in a transient state during a commutation operation, within ½ of commutation interval time which is the time required for the starting time of a certain commutation until the starting time of the next commutation.

2. A driving control device for a brushless motor according to claim 1, wherein an electrical time constant of the brushless motor, which constant contains the impedance of a driving circuit, is ⅙ or less of the commutation interval time.

3. A driving control device for a brushless motor according to claim 2, wherein the current variation rate control part limits the energization interval during which to supply a driving current for a fall phase of the commutation phase of an excitation coil.

4. A driving control device for a brushless motor according to claim 1, wherein the current variation rate control part limits the energization interval during which to supply a driving current for a fall phase of the commutation phase of an excitation coil.

5. A driving control device for a brushless motor according to claim 1 or 2, wherein the current variation rate control part controls the commutation transient time by executing commutation-phase current control by using a rotational speed of the brushless motor as a variable.

6. A driving control device for a brushless motor according to claim 5, wherein the current variation rate control part limits the energization interval during which to supply a driving current for a fall phase of the commutation phase of an excitation coil.

7. A driving control device for a brushless motor according to claim 1 or 2, wherein the current variation rate control part controls the commutation transient time by executing commutation-phase current control by using a rotational electrical angle of the brushless motor as a variable.

8. A driving control device for a brushless motor according to claim 7, wherein the current variation rate control part limits the energization interval during which to supply a driving current for a fall phase of the commutation phase of an excitation coil.

* * * * *